United States Patent
Gulli et al.

(10) Patent No.: US 11,465,774 B2
(45) Date of Patent: Oct. 11, 2022

(54) SYSTEM FOR TOWING AN AIRCRAFT, COMPRISING AN IMPROVED DEVICE FOR CONTROLLING THE DIRECTION OF THE AIRCRAFT

(71) Applicants: Airbus Operations SAS, Toulouse (FR); Airbus SAS, Blagnac (FR)

(72) Inventors: Christian Gulli, Gagnac sur Garonne (FR); Patrick Roussel, Colomiers (FR); Patrick Hubert, Montauban (FR)

(73) Assignees: AIRBUS OPERATIONS SAS, Toulouse (FR); AIRBUS SAS, Blagnac (FR)

( * ) Notice: Subject to any disclaimer, the term of this patent is extended or adjusted under 35 U.S.C. 154(b) by 810 days.

(21) Appl. No.: 16/377,834

(22) Filed: Apr. 8, 2019

(65) Prior Publication Data
US 2019/0308749 A1 Oct. 10, 2019

(30) Foreign Application Priority Data

Apr. 10, 2018 (FR) ...................................... 1853130

(51) Int. Cl.
*B64F 1/10* (2006.01)
*B60D 1/18* (2006.01)
*B64F 1/22* (2006.01)

(52) U.S. Cl.
CPC .................. *B64F 1/10* (2013.01); *B60D 1/18* (2013.01); *B64F 1/224* (2013.01)

(58) Field of Classification Search
CPC ..... B64F 1/10; B64F 1/04; B64F 1/08; B60D 1/18; B62F 1/224; B62F 1/22
See application file for complete search history.

(56) References Cited

U.S. PATENT DOCUMENTS

| | | | | |
|---|---|---|---|---|
| 3,709,522 A | * | 1/1973 | Olson | B60D 1/155 280/475 |
| 3,829,131 A | * | 8/1974 | Moore, Jr. | B60D 1/155 280/491.1 |
| 5,129,667 A | * | 7/1992 | Gratton | B64F 1/224 244/50 |
| 10,450,090 B1 | * | 10/2019 | Scott | B64F 1/22 |
| 2017/0283089 A1 | * | 10/2017 | Patey | B60P 3/11 |

FOREIGN PATENT DOCUMENTS

| CN | 106628230 | * 10/2016 | ................ B64F 1/22 |
|---|---|---|---|
| DE | 1481999 A1 | 8/1969 | |

OTHER PUBLICATIONS

French Search Report; priority document.

* cited by examiner

*Primary Examiner* — Tony H Winner
(74) *Attorney, Agent, or Firm* — Greer, Burns & Crain, Ltd.

(57) ABSTRACT

To avoid the intervention of an operator on a direction control device with which an aircraft towing system is equipped, this system comprises a first towing sling comprising a front end connected to a towing vehicle, and a rear end connected to a first main landing gear, a second towing sling comprising a front end connected to the vehicle, and a rear end connected to a second main landing gear. The direction control device is connected to a front landing gear, and arranged between the first and second slings. The direction control device comprising a lateral direction control member having a first lateral end mounted on the first sling, and a second lateral end mounted on the second sling.

13 Claims, 5 Drawing Sheets

SYSTEM FOR TOWING AN AIRCRAFT, COMPRISING AN IMPROVED DEVICE FOR CONTROLLING THE DIRECTION OF THE AIRCRAFT

CROSS-REFERENCES TO RELATED APPLICATIONS

This application claims the benefit of the French patent application No. 1853130 filed on Apr. 10, 2018, the entire disclosures of which are incorporated herein by way of reference.

FIELD OF THE INVENTION

The present invention relates to the field of aircraft towing, in particular following an abnormal event such as a runway departure. In such a case, the implementation of a specific towing system is usually required, also called rig for getting out of the mud.

The invention applies to the towing of commercial and military airplanes.

BACKGROUND OF THE INVENTION

The known aircraft towing systems usually comprise slings, making it possible to tow on the main landing gear. These slings are generally complemented by a device for controlling the direction of the aircraft, connected to a front landing gear and arranged between the slings. This direction control device is controlled by an operator, who adapts the orientation of the wheels of the front gear as a function of the towing direction applied to the aircraft by the towing vehicle, via the slings.

By proceeding in this way, the operator situated between the towing slings is exposed to risks associated with the possible breaking of one of the elements involved in the moving of the aircraft, such as a cable, a shackle, or even a sling.

There is consequently a need to optimize the existing designs, in order to reduce the risks inherent to the human presence in the zone situated between the slings under tension, during the towing of the aircraft.

SUMMARY OF THE INVENTION

To address this need, a subject of the invention is, first of all, a system for towing an aircraft intended to link this aircraft to at least one towing vehicle, the system comprising:
  a first towing sling comprising a front end intended to be connected to the at least one towing vehicle, and a rear end intended to be connected to a first main landing gear situated on a first side of the aircraft;
  a second towing sling of a length identical to that of the first sling, the second towing sling comprising a front end intended to be connected to the at least one towing vehicle, and a rear end intended to be connected to a second main landing gear situated on a second side of the aircraft opposite the first side; and
  a device for controlling the direction of the aircraft, intended to be connected to a front landing gear of the aircraft, and arranged between the first and second towing slings.

According to the invention, the direction control device comprises:
  a central means for connection to the front landing gear, this central means having a rear end intended to be connected to the front landing gear;
  a lateral direction control means, the lateral means being fixed to the central connection means, and having a first lateral end mounted on the first towing sling, and a second lateral end opposite the first, mounted on the second towing sling.

By virtue of the connection of the lateral ends of the lateral direction control means to the towing slings, an automatic and permanent mechanical link is obtained between the direction of the front gear and the direction of the towing efforts that are exerted in the slings. In other words, it is these same towing slings which automatically control the device for controlling the direction of the aircraft, such that the presence of an operator in the zone close to the slings is no longer required. The risks associated with this presence then become nonexistent.

The invention preferably provides at least one of the following optional features, taken alone or in combination.

The first and second lateral ends are mounted to slide along their respective slings.

Each of the first and second lateral ends has a pulley receiving the associated sling.

Each of the first and second lateral ends is equipped with a guide making it possible to keep the associated sling in contact with the pulley.

The central connection means comprises a longitudinal bar, and the lateral direction control means comprises a transverse bar fixed to the longitudinal bar using a fixing means, the longitudinal and transverse bars being preferably oriented substantially orthogonally relative to one another.

The central connection means comprises a safety device configured to break when a lateral effort, transmitted by the lateral direction control means on the central connection means, exceeds a predetermined maximum value.

The rear end of the central connection means comprises a connector for connection to the front landing gear, the connector being configured to prohibit a rotation of the central connection means relative to the front landing gear, on a longitudinal axis of this central connection means.

Each of the first and second towing slings is equipped with a device for measuring a towing effort in the sling, preferably a dynamometer, the two devices being independent of one another.

The rear end of each of the first and second towing slings is equipped with a connector configured to slide along a connecting strap intended to pass around an axle of the associated main landing gear, on either side of a leg of this landing gear.

The towing system comprises a landing gear wheel protection device, arranged around the connecting strap.

The towing system comprises a mechanical coupling means between at least two independent legs of one and the same main landing gear.

Another subject of the invention is a method for towing an aircraft using such a system, this method comprising the following steps:
  connection of the first and second towing slings to the towing vehicle and to the first and second main landing gear, and connection of the direction control device to the front landing gear and to the first and second towing slings;
  towing of the aircraft by movement of the towing vehicle, towing during which the direction control device is oriented as a function of the efforts applied by the first and second towing slings on the first and second lateral ends of the lateral control means.

Other advantages and features of the invention will become apparent from the nonlimiting detailed description hereinbelow.

BRIEF DESCRIPTION OF THE DRAWINGS

This description will be given in light of the attached drawings in which.

DETAILED DESCRIPTION OF THE PREFERRED EMBODIMENTS

Figure 1:
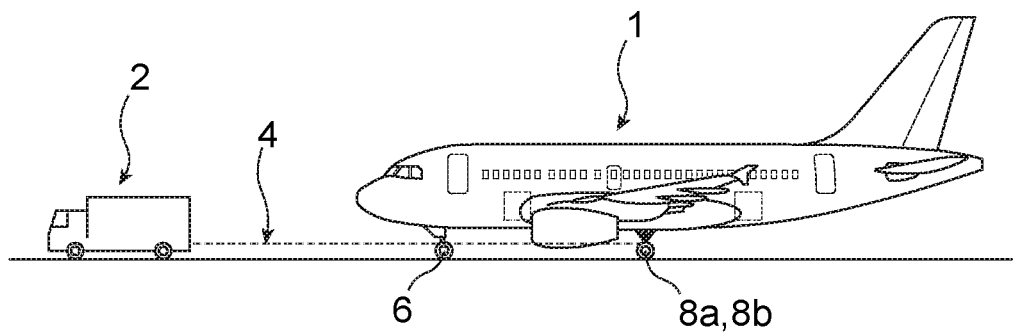
FIG. 1 represents a schematic side view of an aircraft towing operation, using a towing system according to the invention.

Referring first of all to FIG. 1, an operation of towing of an aircraft 1 is represented, using a towing vehicle 2 and a towing system 4 according to the invention. The towing system 4 is interposed between the rear of the towing vehicle 2 and the different landing gear of the aircraft, namely the front landing gear 6 designed to control the taxying direction of the aircraft, and two main landing gear 8a, 8b situated behind the front gear 6.

The towing system 4 is preferentially provided to ensure the recovering of an aircraft stuck in mud, for example following a runway departure. Nevertheless, other applications are possible, such as a normal towing operation on hard ground.

Figure 2:
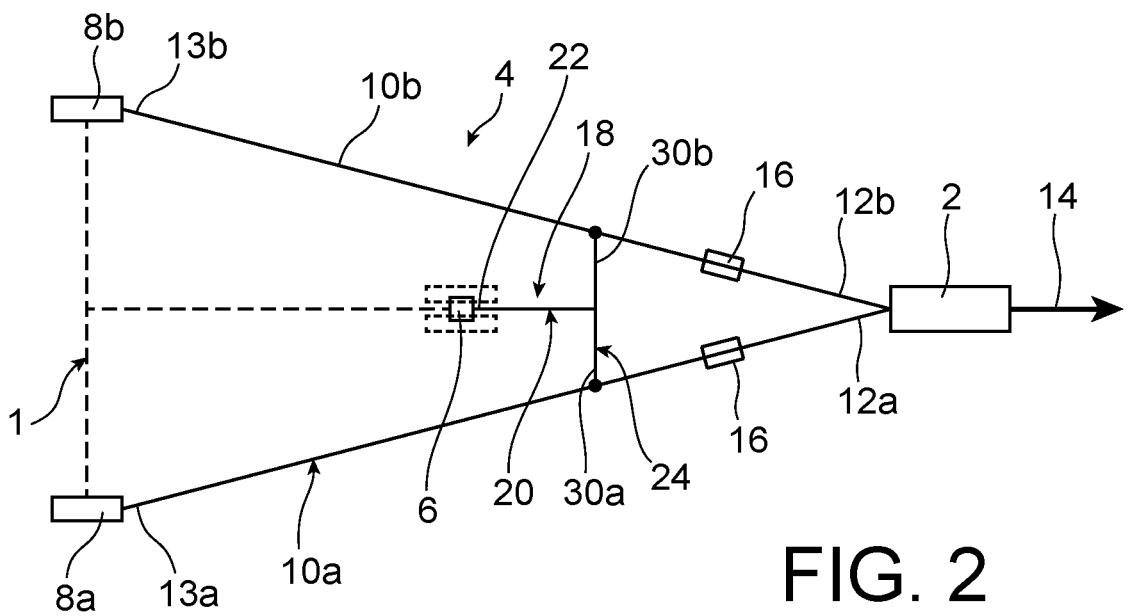
FIG. 2 represents a plan view of a towing system, according to a preferred embodiment of the invention.

Referring now to FIG. 2, this shows the design of the towing system 4 according to a preferred embodiment of the invention, this system 4 being represented during a towing operation following, for example, a runway departure for the aircraft 1.

The system 4 comprises, first of all, a first towing sling 10a, in the form of a cable, chain, strap, or any equivalent element. This first sling 10a comprises a front end 12a intended to be connected to the towing vehicle 2, and a rear end 13a intended to be connected to the main landing gear 8a situated on a first side of the aircraft. This first side corresponds to the right side when looking to the front in the direction of advance 14 of the aircraft, during the operation of extraction from the mud.

Likewise, a second towing sling 10b is provided, of the same length as the first sling 10a, also in the form of a cable, chain, strap, or any equivalent element. This second sling 10b comprises a front end 12b intended to be connected to the towing vehicle 2, and a rear end 13b intended to be connected to the main landing gear 8b situated on a second side of the aircraft. This second side, opposite the first, corresponds to the left side when looking to the front in the direction of advance 14 of the aircraft.

In this embodiment, the two towing slings 10a, 10b are mounted connected to one and the same towing vehicle 2 (or two towing vehicles if appropriate), preferably remaining independent of one another. In fact, no provision is preferentially made for the two slings 10a, 10b to be connected together at their front ends 12a, 12b, nor for them to slide along one and the same pulley fixed onto the towing vehicle 2. This type of configuration can effectively lead to an undesirable pivoting of the aircraft about the main gear immobilized and stuck in the ground.

Thus, each front end 12a, 12b is preferably equipped with its own connector such as a shackle, which is mounted on a complementary member arranged on the towing vehicle 2. According to one alternative that is envisaged, two towing vehicles are provided, each dedicated to the towing of one of the two slings 10a, 10b. In such a case, it is necessary to synchronize the advance and the direction of the two vehicles.

To ensure the balancing of the efforts conveyed by the two slings, each of them is equipped with an independent device 16 for measuring a towing effort in the sling concerned. These devices 16, which preferably take the form of dynamometers or of any other equivalent device, make it possible not only to ensure that the towing efforts conveyed by the two slings are relatively balanced, but also to ensure that these efforts applied to the two main landing gear 8a, 8b do not exceed a limit value likely to damage these landing gear or to cause a breaking of the slings.

The two slings of the system 4 are complemented by a device for controlling the direction of the aircraft, this device 18 being arranged between these two slings 10a, 10b. It comprises, first of all, a central means 20 for connecting to the front landing gear 6, this central means being formed by a longitudinal bar, such as a towing bar whose rear end 22 is intended to be connected to the front landing gear 6.

Figure 2A:
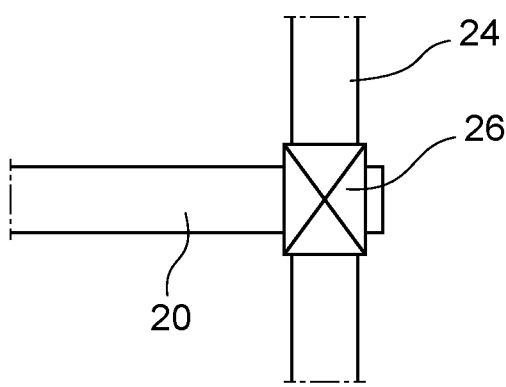
FIG. 2a represents a plan view of a part of the towing system shown in FIG. 2.

At the front end of this longitudinal bar 20, the direction control device 18 comprises a lateral direction control means 24, formed by a transverse bar. As shown in FIG. 2a, the two bars 20, 24 are fixed to one another using a fixing means 26, and they are oriented substantially orthogonally relative to one another. Alternatively, the transverse bar 24 could be a V-shaped structure, with the point of the V fixed to the longitudinal bar 20. Any other form could also be envisaged, exhibiting symmetry relative to a median vertical and longitudinal plane of the device 18. The angle formed between the longitudinal bar 20 and the lateral direction control means 24 remains fixed. Furthermore, the connection of the means 24 to the longitudinal bar 20 could be done at a point other than its front end, without departing from the scope of the invention.

Preferentially, the direction control device 18 is mounted on a wheel whose height is adjustable, to make it bear on the ground. Furthermore, each of the two bars 20, 24 is preferably adjustable in length, to be adapted to the length of the slings and to the angle of the V formed by the latter.

One of the particular features of the invention lies in the fact that this direction control device 18 is controlled by the slings 10a, 10b. For this, a first lateral end 30a of the transverse bar 24 is mounted on the first towing sling 10a between its front and rear ends 12a, 13a, and likewise a second lateral end 30b, opposite the first, is mounted on the second towing sling 10b between its front and rear ends 12b, 13b.

Thus, an automatic and permanent mechanical link is obtained between the direction of the front gear 6, and the direction of the towing efforts that are exerted in the slings 10a, 10b. It is in fact these same slings which automatically control the orientation of the direction control device 18, such that the presence of an operator in the hazardous zone between the slings is no longer required.

As an indication, it is noted that the lateral ends 30a, 30b could be connected differently to the slings 10a, 10b, for example by being secured to the latter at fixed symmetrical points of these two slings.

Figure 3:
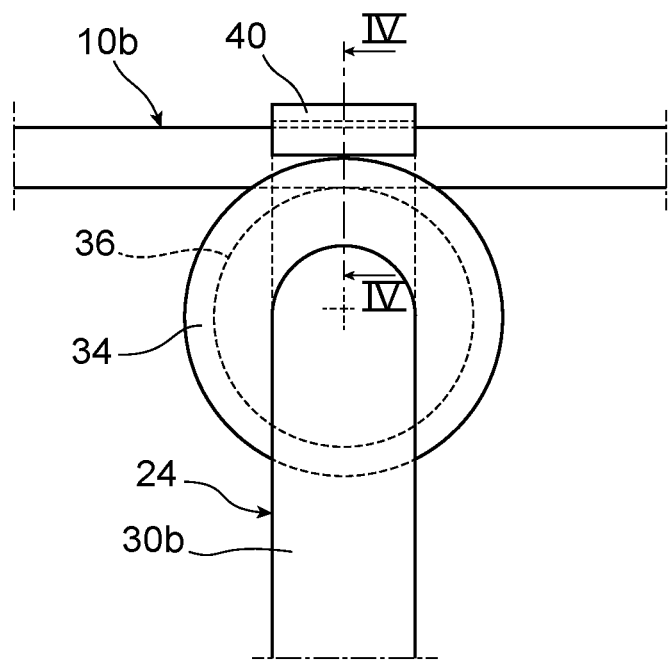
FIG. 3 represents a plan view of another part of the towing system shown in FIG. 2.
Figure 4:
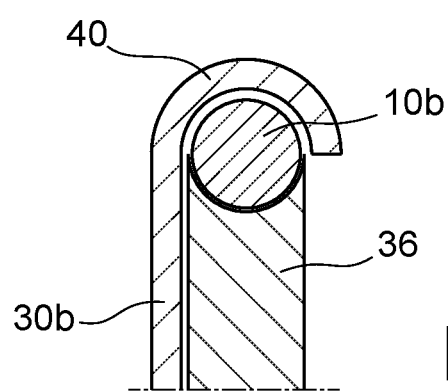
FIG. 4 is a cross-sectional view taken along the line IV-IV of FIG. 3.

Now referring to FIGS. 3 and 4, the nature of the connection between the second lateral end 30b and the second sling 10b is shown, it being understood that a same connection is provided between the first lateral end 30a and the first sling 10a.

The lateral end 30b bears a pulley 34, or any other similar device, the groove 36 of which receives the sling 10b. By virtue of this mounting, the lateral end 30b is thus mounted to slide along the sling 10b. Furthermore, to keep the sling 10b in the groove 36 even when this sling is no longer under tension, the lateral end 30b is equipped with a guide 40 arranged such that the sling is kept in contact with the pulley 34, gripped between the bottom of the groove 36 and this same guide 40. The latter, borne by the lateral end 30b, is adjustable in order to allow the introduction of the sling 10b into the groove 36, during the mounting of the device 18 which is done before the towing of the aircraft.

Figure 5:
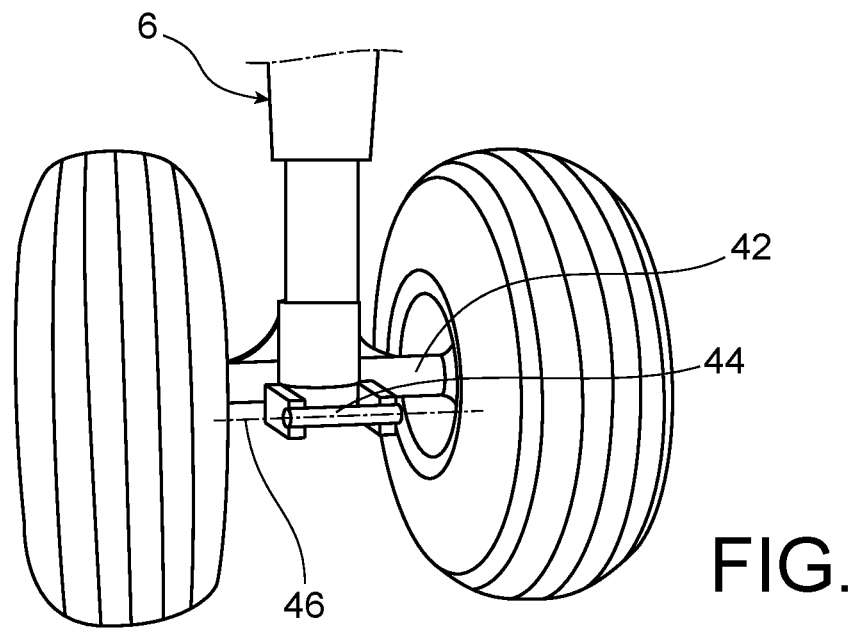
FIG. 5 is a perspective schematic view of a part of a front landing gear of the aircraft, to which the towing system is intended to be connected.
Figure 6:
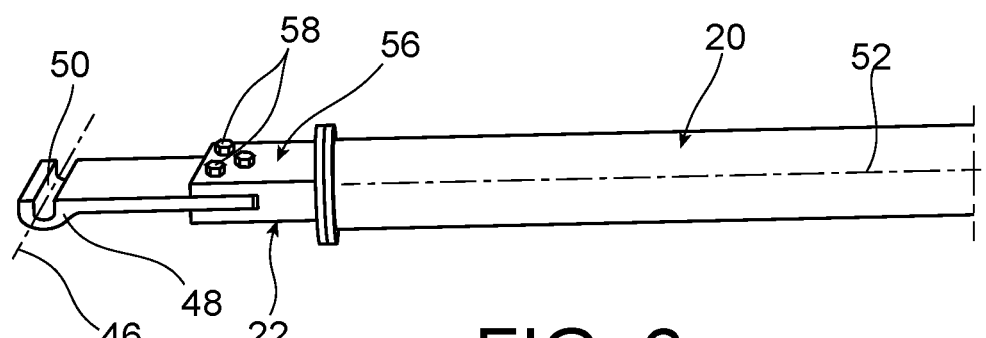
FIG. 6 is a perspective view of a part of the towing system intended to be connected to the front landing gear.

Now referring to FIGS. 5 and 6, provision is made for the front gear 6 to have, in proximity to an axle 42, an elongate coupling member 44 extending along a transverse axis 46 parallel to the axle. The elongate coupling member 44 is provided to cooperate with a connecting connector 48 incorporated at the rear end 22 of the longitudinal bar 20. This connector 48 has a recess 50 of a form complementing that of the member 44, extending along the same transverse axis 46. Consequently, once coupled, these two elements 44, 50 prohibit the rotation of the device 18 on a longitudinal axis 52 of the bar 20, but they allow a rotation of the device 18 on the transverse axis 46 of coupling between the device 18 and the front gear 6.

Still at the rear end 22 of the longitudinal bar 20, this end comprises a safety device 56 arranged between the connecting connector 48, and the other part of the bar 20. The safety device 56 is configured to break when a lateral effort, transmitted by the transverse bar 24 on the longitudinal bar 20, exceeds a predetermined maximum value. It is, for example, formed by gauged shear bolts 58, arranged vertically and passing through the connector 48 and the other part of the bar 20. This particular feature makes it possible to avoid introducing into the front gear 6 efforts that are likely to damage it, particularly at the start of the towing in the case where the gear adopts a direction requiring strong straightening. The safety device 56 could be located at any other point of the bar 20, without departing from the scope of the invention.

Figure 7:
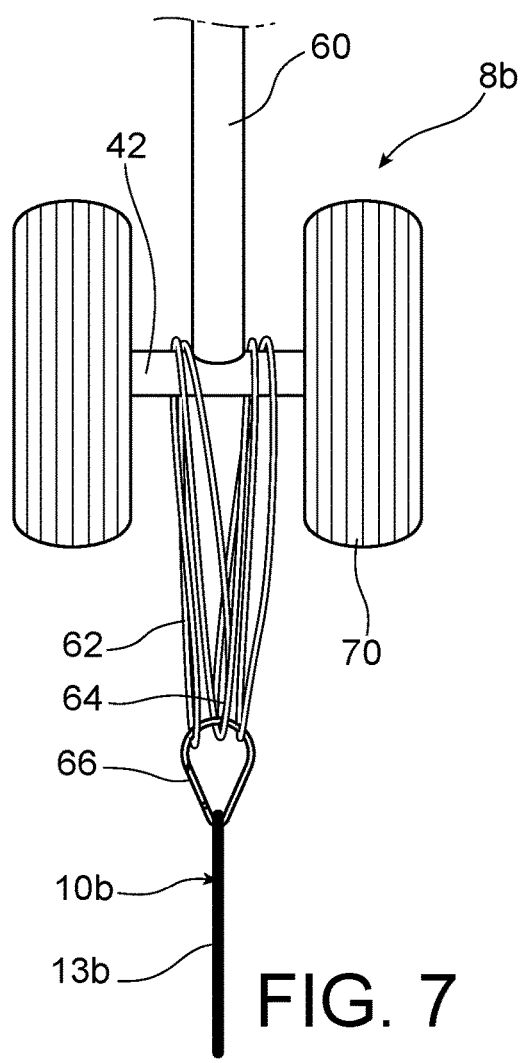
FIG. 7 is a perspective view of a connecting strap intended to ensure the connection between a sling and a main landing gear.
Figure 8:
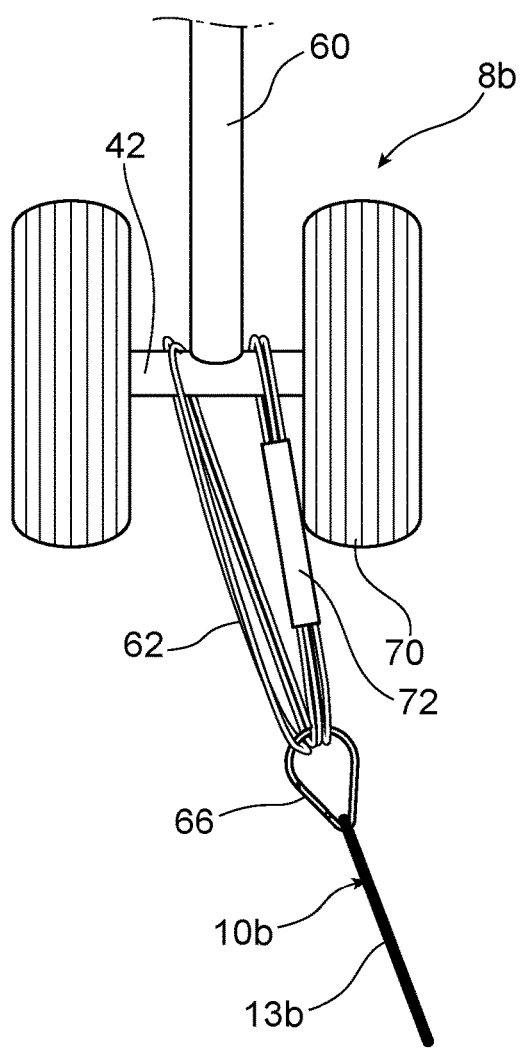
FIG. 8 is a perspective view similar to that of FIG. 7, with the connecting strap equipped with a main landing gear wheel protection device.

Now referring to FIGS. 7 and 8, a part of the second main landing gear 8b is represented, showing a leg 60 bearing the axle 42. A connecting strap 62 passes around the axle 42, on either side of the leg 60 by forming a loop 64 that is passed through by a connector 66 in the form of a shackle, fixed to the rear end 13b of the second sling 10b. This connector 66 is designed to slide along the connecting strap 62, in order to permanently balance the efforts conveyed by the portions of this strap situated on one side of the leg 60, and the portions of this same strap situated on the opposite side of the leg 60.

Give that the angle of these strap portions varies as a function of the towing direction applied by the sling 10b, there is a risk of the wheels 70 of the gear 8b coming into contact with the connecting strap 62. To avoid any risk of damage, these strap portions are surrounded by a wheel protection device 72, shown in FIG. 8. This device 72 can, for example, take the form of a tube, supple or semirigid, capable of being rotated about the strap portions which bear it, by being driven by the wheel in contact.

Quite obviously, such a connecting strap and its wheel protection device can be implemented identically or similarly on the other main landing gear 8a.

Figure 9:
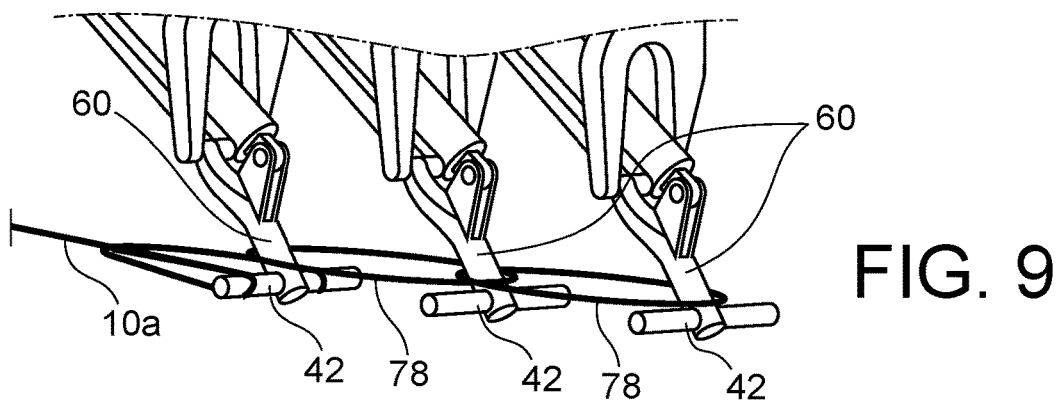
FIG. 9 represents a perspective view of a part of the towing system, making it possible to mechanically couple independent legs of one and the same main landing gear.

Finally, it is noted with reference to FIG. 9 that, when the main landing gear comprise several legs 60 that are independent of one another, each controlled by a distinct control system and bearing its own axle 42, mechanical coupling means are then preferentially provided between these legs 60. More specifically, a mechanical coupling means 78 is provided for each set of two independent legs 60 directly consecutive in one and the same gear, and this is done in order to better distribute the towing efforts introduced into the gear by the sling. In the example represented in FIG. 9 which comprises three legs, two coupling means 78 are provided, each in the form of a strap surrounding two directly consecutive legs 60.

To perform a towing of the aircraft using a towing vehicle 2 and a towing system 4 such as that which has just been described, the connecting of the ends of the slings 10a, 10b, and the connecting of the direction control device 18 to the front gear 6, and to the slings, are carried out first of all.

Next, the step of towing of the aircraft as schematically represented in FIG. 2 is implemented by movement of the towing vehicle 2, in the direction of advance 14 corresponding to the direction of flight of the aircraft. As mentioned previously, during this step, the direction control device 18 is oriented as a function of the efforts applied by the first and second slings 10a, 10b to the first and second lateral ends 30a, 30b of the transverse bar 24. In particular, when the towing vehicle 2 maintains a straight direction of advance, the two slings 10a, 10b remain symmetrical and apply lateral efforts of similar intensities to the opposite ends 30a, 30b of the transverse bar 24. Because of this, the longitudinal bar 20 remains advantageously parallel to the direction of advance of the towing vehicle 2, which makes it possible to best orient the front gear 6 during the towing.

Figure 10:
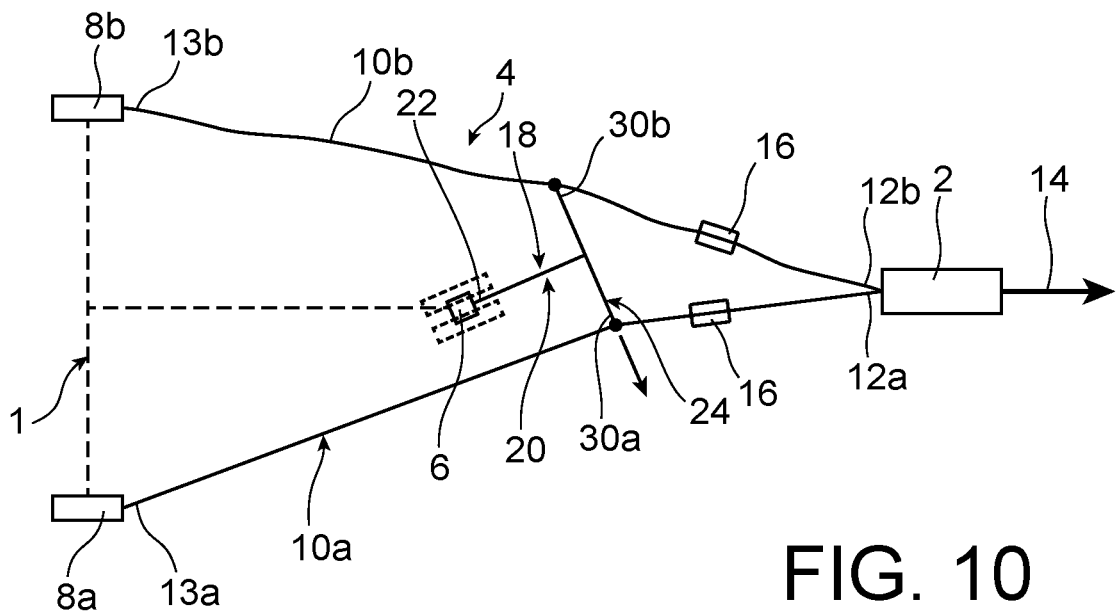
FIG. 10 is a plan view similar to that of FIG. 2, in a configuration of start of towing of the aircraft, with the front landing gear having a direction inclined to the left.

FIG. 10 shows a configuration of start of towing of the aircraft, with the particular feature of a front landing gear 6 having a direction inclined relative to the direction in which the aircraft is supposed to be towed. In this example, the direction of the front gear 6 is inclined to the left. After the towing system 4 has been assembled, the forward movement of the towing vehicle 2 causes the first sling 10a to be pulled taut before the second sling 10b. This tension on the sling 10a provokes a lateral effort on the transverse bar 24 which tends to move the latter to the right, thus gradually straightening the direction of the device 18.

Figure 11:
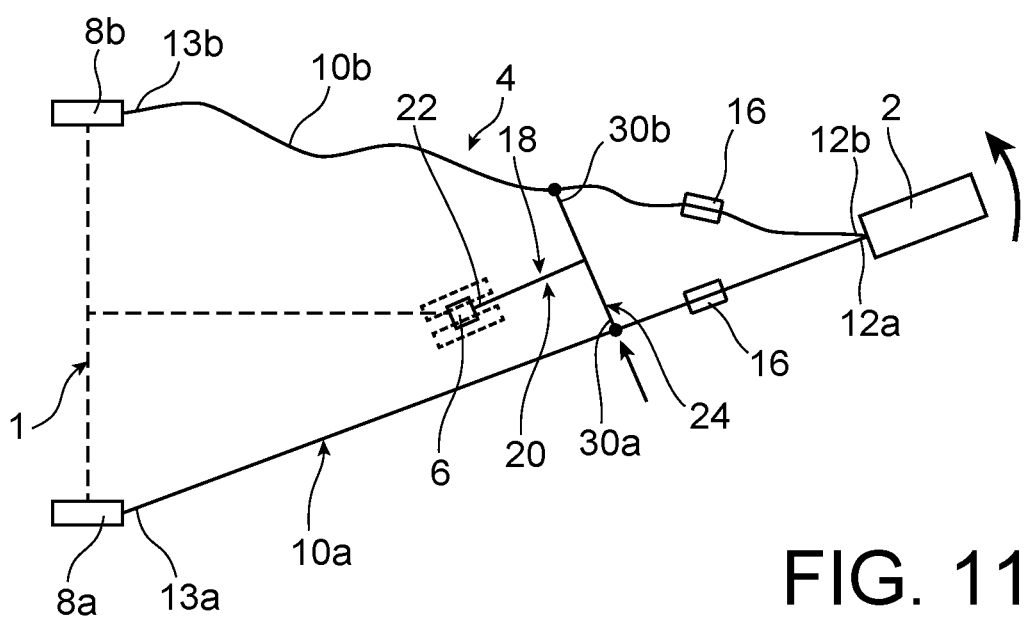
FIG. 11 is a plan view similar to that of FIG. 2, in a configuration of towing the aircraft as observed during a turn performed by the towing vehicle.

FIG. 11 shows another towing configuration, as observed during a turn performed by the towing vehicle 2, to the left. In this hypothesis, the first sling 10a, situated on the outside relative to the direction of the turn, is kept under tension whereas the second, inner sling 10b is relaxed. Consequently, a lateral effort is transmitted to the first lateral end 30a of the transverse bar 24, without any opposing effort being produced on the second lateral end 30b. Consequently, the direction control device 18 is forced to pivot to the left, which makes it possible to apply to the front gear 6 a direction substantially similar to that of the vehicle 2, at any instant during the turn.

This towing operation is preferably performed with the front gear direction system deactivated, which renders it free to rotate, and thus makes it easily controllable by the device 18 specific to the invention. In fact, during the towing for extraction from mud, the aircraft may not be powdered, thus creating an electrical, hydraulic and other such loss.

Obviously, various modifications can be made by the person skilled in the art to the invention which has just been described, purely by way of nonlimiting examples, and the scope of which is defined by the attached claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A towing system for an aircraft configured to link the aircraft to at least one towing vehicle, the system comprising:
   a first towing sling comprising a front end configured to connect to said at least one towing vehicle, and a rear end configured to connect to a first main landing gear situated on a first side of the aircraft;
   a second towing sling of a length identical to a length of the first sling, the second towing sling comprising a front end configured to connect to said at least one towing vehicle, and a rear end configured to connect to a second main landing gear situated on a second side of the aircraft opposite the first side;
   wherein the first and second landing gears, each includes at least one independent leg; and
   a direction control device configured to control a direction of the aircraft, configured to connect to a front landing gear of the aircraft, and arranged between the first and second towing slings,
   wherein the direction control device comprises:
      a central means for connection to the front landing gear, the central means having a rear end configured to connect to the front landing gear;
      a lateral direction control means, the lateral means being fixed to the central connection means, and having a first lateral end mounted on the first towing sling, and a second lateral end opposite the first, mounted on the second towing sling.

2. The towing system as claimed in claim 1, wherein the first and second lateral ends are mounted to slide along their respective slings.

3. The towing system as claimed in claim 2, wherein each of the first and second lateral ends has a pulley receiving the associated sling.

4. The towing system as claimed in claim 3, wherein each of the first and second lateral ends is equipped with a guide keeping the associated sling in contact with the pulley.

5. The towing system as claimed in claim 1, wherein said central connection means comprises a longitudinal bar, and wherein said lateral direction control means comprises a transverse bar fixed to the longitudinal bar, the longitudinal and transverse bars being oriented substantially orthogonally relative to one another.

6. The towing system as claimed in claim 1, wherein the central connection means comprises a safety device configured to break when a lateral effort, transmitted by the lateral direction control means on the central connection means, exceeds a predetermined maximum value.

7. The towing system as claimed in claim 1, wherein the rear end of the central connection means comprises a connector for connection to the front landing gear, the connector being configured to prohibit a rotation of the central connection means relative to the front landing gear, on a longitudinal axis of the central connection means.

8. The towing system as claimed in claim 1, wherein each of the first and second towing slings is equipped with a device for measuring a towing effort in the sling, the two devices being independent of one another.

9. The towing system as claimed in claim 8, wherein the devices for measuring a towing effort comprise dynamometers.

10. The towing system as claimed in claim 1, wherein the rear end of each of the first and second towing slings is equipped with a sliding connector configured to slide along a connecting strap intended to pass around an axle of the associated main landing gear, on either side of a leg of the main landing gear.

11. The towing system as claimed in claim 10, further comprising a landing gear wheel protection device, arranged around said connecting strap.

12. The towing system as claimed in claim 1, wherein the at least one independent leg of the first and second landing gears, each includes a plurality of independent legs and a mechanical coupling means attaching between the plurality of independent legs.

13. A method for towing an aircraft using a system as claimed in claim 1, comprising the following steps:
   connecting the first and second towing slings to the towing vehicle and to the first and second main landing gear, and connection of the direction control device to the front landing gear and to the first and second towing slings;
   towing the aircraft by movement of the towing vehicle, towing during which the direction control device is oriented as a function of efforts applied by the first and second towing slings on the first and second lateral ends of the lateral control means.

* * * * *